United States Patent [19]

Hattori et al.

[11] Patent Number: 5,192,480
[45] Date of Patent: Mar. 9, 1993

[54] METHOD OF PRODUCING MOLECULAR COMPOSITE MATERIAL INCLUDING AROMATIC POLYTHIAZOLE

[75] Inventors: Tatsuya Hattori, Tokyo; Hiroshi Akita, Asaka, both of Japan

[73] Assignee: Honda Giken Kogyo Kabushiki Kaisha, Tokyo, Japan

[21] Appl. No.: 753,372

[22] Filed: Aug. 30, 1991

[30] Foreign Application Priority Data

Sep. 3, 1990 [JP] Japan ................... 2-232699

[51] Int. Cl.$^5$ .................. B29C 47/00; D01F 6/74
[52] U.S. Cl. .................. 264/204; 264/205; 264/331.11; 264/331.21; 525/420; 525/535; 528/337; 528/373
[58] Field of Search ........... 264/204, 205, 331.11, 264/331.19, 331.21; 528/336, 337; 525/420, 535

[56] References Cited

U.S. PATENT DOCUMENTS

4,749,753  6/1988  Nishihara et al. .............. 525/411

FOREIGN PATENT DOCUMENTS

346017   12/1989  European Pat. Off. .
346094   12/1989  European Pat. Off. .
64-1760   1/1989  Japan .
64-1761   1/1989  Japan .
1-287167 11/1989  Japan .
2-7976    2/1990  Japan .

OTHER PUBLICATIONS

Markromolekulare Chemie, Macromolecular Chemistry and Physics, vol. 191, No. 9, Feb. 19, 1990, Basel CH Kricheldorf et al; 'New Polymer Synthesis, Soluble and meltable poly(benzobisthiazole)s derived from substituted terephthalic acids', pp. 2017–2026.

*Primary Examiner*—Leo B. Tentoni
*Attorney, Agent, or Firm*—Birch, Stewart, Kolasch & Birch

[57] ABSTRACT

A method of producing a molecular composite material including a rigid aromatic polythiazole and a matrix polymer is disclosed which includes the steps of:

(a) polymerizing an aromatic diaminodithiol compound, hydrogen atoms of thiol groups of which aromatic diaminodithiol compound are substituted with substituted or unsubstituted alkyl groups, with a dicarboxylic acid derivative to form an aromatic polythiazole prepolymer;

(b) preparing a homogeneous solution of the aromatic polythiazole prepolymer and the matrix polymer in an organic solvent; and (c) after removing the organic solvent, heating a mixture of the aromatic polythiazole prepolymer and the matrix polymer to cause a thiazole ring closure reaction.

28 Claims, 4 Drawing Sheets

METHOD OF PRODUCING MOLECULAR COMPOSITE MATERIAL INCLUDING AROMATIC POLYTHIAZOLE

BACKGROUND OF THE INVENTION

The present invention relates to a method of producing a molecular composite material comprising a rigid aromatic polythiazole and a matrix polymer, which molecular composite material is suitable as a structural material for aircrafts, automobiles, spacecrafts, etc.

Recently, to achieve the reduction of weight of aircrafts, automobiles, etc., plastic materials called "engineering plastics" having excellent mechanical properties, heat resistance, etc. have been increasingly used. Apart from this, development has been actively carried out to provide composite materials such as FRPs consisting of plastic materials and high-strength, high-modulus fibers such as carbon fibers, and these composite materials are being used in many applications.

It is known that the strength of these composite materials largely depend not only on the strength of plastics and reinforcing fibers but also on the interfacial strength of the fibers to the matrix resins. Also, the impregnating capability of matrix resins into the fiber-reinforced preforms affect the ease of production of composite materials and the strength of the resulting products. Accordingly, even though high-strength, high-modulus fibers and resins are used as starting materials, composite materials having excellent strength are not necessarily obtained.

Under such circumstances, to overcome the above problems, proposals have been made to develop high-strength polymer blend composites (molecular composite materials) by finely dispersing rigid polymers such as aromatic polyamides, etc. in matrix resins to a molecular level.

Aromatic polymers suitable for molecular composite materials include those containing heterocyclic repeating units such as thiazole rings, imidazole rings, oxazole rings, etc. Among them, aromatic polythiazole having a thiazole ring is highly promising because of its excellent mechanical strength.

In the meantime, the homogeneous dispersion of a reinforcing polymer in a matrix polymer cannot be achieved if the reinforcing polymer is simply blended with the matrix polymer. This means that simple blending fails to provide a molecular composite material having excellent mechanical properties. Therefore, various attempts have been made so far.

For instance, Japanese Patent Laid-Open No. 1-287167 discloses a method of producing a polymer composite comprising the steps of introducing a polymer solution mainly containing (A) a reinforcing polymer consisting of polythiazole having a substantially rod-shaped skeleton and (B) a fusable matrix polymer into a solidification bath, and forming it into a film, the above polymer solution showing an optical anisotropy and being solidified via an apparent, optically isotropic phase after immersion in the solidification bath.

Japanese Patent Publication No. 2-7976 discloses a polymer composition comprising a reinforcing polymer A consisting of polythiazole having a substantially rod-shaped skeleton, and a matrix polymer B consisting of a less-crystallizable aromatic copolyamide having a glass transition temperature of 200° C. or higher and a flow initiation temperature of 500° C. or lower, a weight ratio A/(A+B) being 0.15-0.70. When the aromatic copolyamide is kept at a temperature between its glass transition temperature and its flow-initiation temperature for an arbitrary period of time within 5 hours, the resulting crystals have apparent sizes of 25 Å or less.

However, in the methods of producing polymer composites as disclosed in Japanese Patent Laid-Open No. 1-287167 and Japanese Patent Publication No. 2-7976, homogeneous dispersions of the reinforcing polymers in matrix polymers are not expected. This means that the resulting molecular composite materials do not show largely improved mechanical strength, etc. This appears to be due to the fact that the rigid reinforcing polymers and the matrix polymers do not show good compatibility with each other.

Thus, proposals have been made to provide a method of producing a molecular composite material of a rigid aromatic polymer without resorting to mixing the rigid aromatic polymer and a matrix polymer in an acidic solvent, the method comprising the steps of homogeneously mixing a prepolymer of the rigid aromatic polymer and a matrix polymer or its prepolymer in an organic solvent, removing the organic solvent and then heating it so that the rigid aromatic polymer is formed from its prepolymer (Japanese Patent Laid-Open Nos. 64-1760 and 64-1761). By the above methods, molecular composite materials having relatively good mechanical strength, etc. can be produced.

However, since these molecular composite materials fail to show sufficiently high mechanical strength, further improvement is desired. Insufficient mechanical strength of the conventional molecular composite materials obtained by using the aromatic polythiazole prepolymers is due to the fact that in the process of producing the aromatic polythiazole prepolymers, part of thiol groups in the prepolymers is subjected to a thiazole ring-closure reaction or a cross-linking reaction, forming insoluble components, and that therefore good dispersion of aromatic polythiazole cannot be achieved.

OBJECT AND SUMMARY OF THE INVENTION

Accordingly, an object of the present invention is to provide a method of producing a molecular composite material having excellent mechanical strength, etc., thereby eliminating the above problems.

As a result of intense research in view of the above object, the inventors have found that by using an aromatic diaminodithiol compound, hydrogen atoms of thiol groups of which compound are substituted with substituted or unsubstituted alkyl groups, reacting this aromatic diaminodithiol compound with a dicarboxylic acid derivative to form an aromatic polythiazole prepolymer, homogeneously dissolving this prepolymer and a matrix polymer in an organic solvent, and heating it after removing the organic solvent, a molecular composite material having the aromatic polythiazole homogeneously dispersed in the matrix polymer can be obtained. The present invention has been completed based upon this finding.

Thus, the method of producing a molecular composite material comprising a rigid aromatic polythiazole and a matrix polymer, comprises the steps of:
 (a) polymerizing an aromatic diaminodithiol compound, hydrogen atoms of thiol groups of which aromatic diaminodithiol compound are substituted with substituted or unsubstituted alkyl groups, with a dicarboxylic acid derivative to form an aromatic polythiazole prepolymer;

(b) preparing a homogeneous solution of the aromatic polythiazole prepolymer and the matrix polymer in an organic solvent; and (c) after removing the organic solvent, heating a mixture of the aromatic polythiazole prepolymer and the matrix polymer to cause a thiazole ring closure reaction.

DETAILED DESCRIPTION OF THE INVENTION

Figure 1:
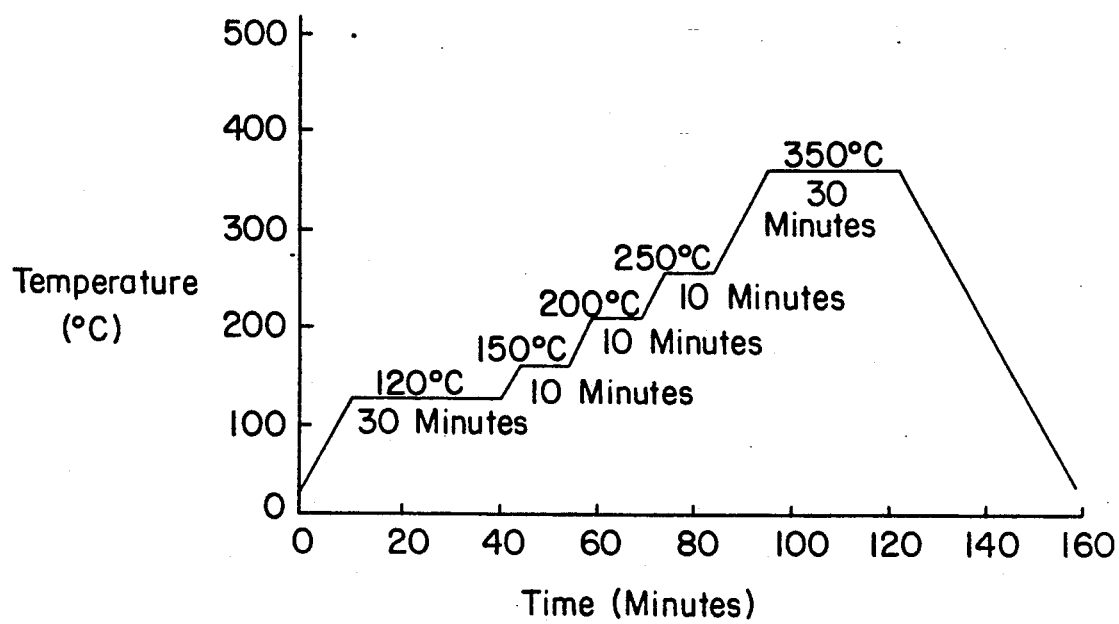
FIG. 1 is a graph showing a heating pattern of a film in Example 1.

The present invention will be explained in detail below.

[A] Alkyl Group-Substituted Aromatic Diaminodithiol

The alkyl group-substituted aromatic diaminodithiol is synthesized from an aromatic diaminodithiol and an alkyl halide having substituted or unsubstituted alkyl groups. The aromatic diaminodithiol compound used in the form of a salt is a compound having amino groups and thiol groups on both sides of its aromatic residual group, and the aromatic residual group may be not only a benzene ring but also any aromatic ring in which 2 or more benzene rings are condensed. Further, the aromatic residual group may be those having 2 or more benzene rings bonded to each other, such as biphenyl. The amino groups and the thiol groups on both sides may be bonded to the aromatic residual group symmetrically with respect to its axis or its central point. Typical examples of such aromatic diaminodithiol compounds are:

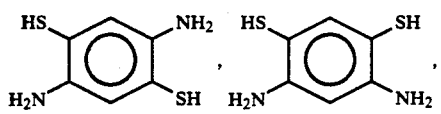

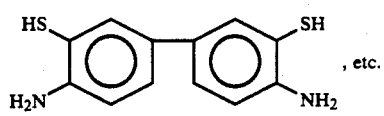

These aromatic diaminodithiol compounds are used in the form of a salt such as a hydrochloride to prevent their deterioration.

The alkyl groups bonded to the thiol groups of the aromatic diaminodithiol compound are substituted or unsubstituted alkyl groups. The unsubstituted alkyl groups include an isopropyl group, an ethyl group, an n-propyl group, an n-butyl group, a sec-butyl group, a tert-butyl group, etc. Among them, secondary or tertiary alkyl groups are particularly preferable.

The substituted alkyl groups include alkyl groups substituted with a carboxyl group, and ester group, a cyano group, a benzyl group, a halogen group, a nitro group, etc. Incidentally, in the case of having such substituent groups, the alkyl groups, need not be secondary ones. The substituted alkyl groups include specifically:

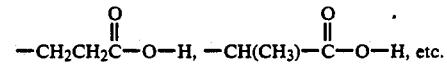

Incidentally, with respect to the first two alkyl groups among the above six substituted alkyl groups, alkyl groups bonded to an oxygen atom in the ester bond need not be a methyl group, and they may be longer linear alkyl groups.

Particularly when the hydrogen atoms in the thiol groups of the aromatic diaminodithiol compound are substituted with an alkyl group having a cyano group, an ester group or a carboxyl group, the resulting prepolymer can be subjected to a ring closure reaction at a relatively low temperature of 250°–350° C. In addition, the resulting prepolymer can be easily dissolved in an organic solvent such as N-methyl-2-pyrrolidone, etc.

By selecting an alkyl group having a proper length of a carbon chain (carbon number: about 2–5), the molecular composite materials having excellent physical and chemical properties can be produced as described below.

The above alkyl group is used in the form of a halide, namely an alkyl halide. The halides which may be used in the present invention are bromides, chlorides, iodides, etc. of the above alkyl groups.

[B] Dicarboxylic Acid Derivatives

The dicarboxylic acid derivatives used in the present invention include those having carboxylic groups substituted as follows:

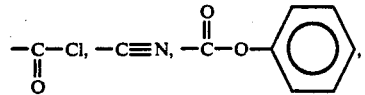

-continued

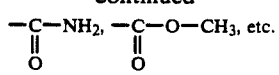

The residual groups of the above dicarboxylic acid derivatives are preferably aromatic groups, and their specific examples are as follows:

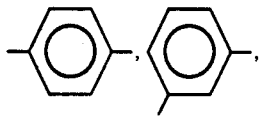

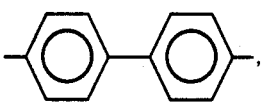

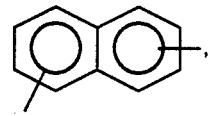

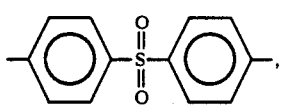

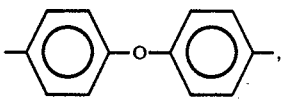

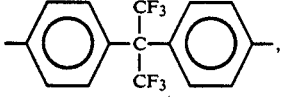

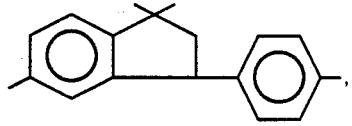

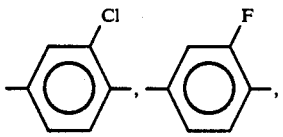

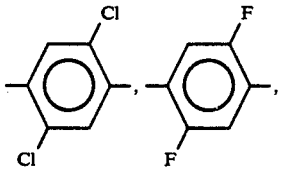

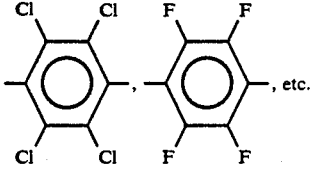

Preferred among them is terephathalic acid. Incidentally, the dicarboxylic acid derivative may be used alone or in combination.

[C] Matrix Polymers

The matrix polymers usable in the present invention include aramide resins polyether sulfones, polyetherimides, thermoplastic polyimides, thermosetting polyimides, polyamideimides, etc. Since these resins have excellent compatibility with the aromatic polythiazole prepolymer, they can provide molecular composite materials with excellent mechanical strength.

[D] Production of Molecular Composite Material

First, the aromatic polythiazole prepolymer is produced. The aromatic polythiazole prepolymer may be produced, for instance, by the following steps.

(a) Reacting the aromatic diaminodithiol compound salt with an alkyl in an alkaline aqueous solvent, so that hydrogen atoms in thiol groups of the aromatic diaminodithiol compound are substituted with the alkyl group; and (b) Polymerizing the monomer obtained in the step (a) with the dicarboxylic acid derivative to form an aromatic polythiazole prepolymer.

The above steps will be explained below.

In the step (a), the aromatic diaminodithiol compound salt is reacted with an alkyl halide in an alkaline aqueous solvent. The alkaline aqueous solvent used may be water or a mixture of water and alcohol (ethanol and/or methanol) in which an alkaline salt such as sodium hydroxide is dissolved. By using an alkaline aqueous solvent, the aromatic diaminodithiol compound salt can be easily dissolved, while increasing a nucleophilic nature of the thiol groups. This accelerates the substitution reaction of hydrogen atoms in the thiol groups with the substituted or unsubstituted alkyl group. Incidentally, the alkali concentration in the alkaline aqueous solvent is preferably 30 weight % or less.

The substitution reaction can be conducted at a temperature of 0°-100° C. When the substitution temperature is lower than 0° C., the substitution reaction rate is too small. On the other hand, when it exceeds 100°C, a secondary reaction is likely to take place. The preferred temperature is 0°-95° C.

The reaction time is not specifically restricted, but it is generally about 2-24 hours.

Incidentally, to accelerate the substitution to reaction, the solution is preferably stirred. Also, by using an excess amount of an alkyl halide, the reaction rate can be increased.

Further, by adding cetyl trimethyl ammonium chloride, cetyl trimethyl ammonium bromide, n-butyl triphenyl phosphonium bromide, tetraphenyl phosphonium bromide, 18crown-6, etc. as a phase transfer catalyst, the reaction between the aromatic diaminodithiol compound salt and the alkyl halide can be accelerated.

By conducting the substitution reaction under the above conditions, the hydrogen atoms in the thiol groups of the aromatic diaminodithiol compound salt can be substituted with the alkyl groups.

in the reaction of this step (a), the reaction of the aromatic diaminodithiol compound salt and the alkyl halide proceeds as follows. Here, the aromatic diaminodithiol compound salt is exemplified by 2,5-diamino-1,4-benezenethiol dihydrochloride.

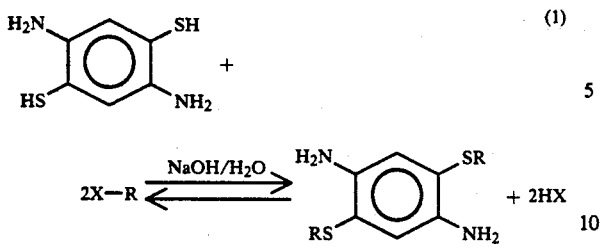

(1)

wherein X-R represents an alkyl halide.

In the step (b), the monomer obtained in the step (a) is polymerized with the dicarboxylic acid derivative to synthesize an aromatic polythiazole prepolymer. In this case, the monomer obtained in the step (a) and the dicarboxylic acid derivative are mixed in an equimolar ratio, and subjected to polymerization under the conditions as described below.

The solvents which may be used in the reaction are N-methyl-2-pyrrolidone, hexamethyl phosphoric triamide, N,N-dimethylacetamide, etc., which may be used alone or in combination. To increase solubility, chlorides such as LiCl, $CaCl_2$, etc. may be added in an amount up to 10%.

The monomer obtained in the step (a) and the dicarboxylic acid derivative are dissolved in the above solvent in an equimolar ratio, and subjected to a polymerization reaction at a temperature between $-20°$ C. and $+100°$ C. When the polymerization temperature is lower than $-20°$ C., a sufficient polymerization reaction does not take place. On the other hand, when it exceeds $+100°$ C., the side reaction is likely to take place. Incidentally, when it exceeds $+50°$ C., the resulting prepolymer tends to have a low polymerization degree. Accordingly, the preferred polymerization temperature range is $-20°$ C. to $+50°$ C. The more preferred polymerization temperature is between $-20°$ C. and $+30°$ C.

The monomer concentration is preferably about 0.1–2 mol/l. When the monomer concentration exceeds 2 mol/l, the monomer cannot completely be dissolved.

In the polymerization reaction in the step (b), the solution is preferably stirred to increase the polymerization reaction rate. The polymerization reaction time is not particularly restricted, but it is generally about 1–24 hours.

By the polymerization reaction under the above conditions, the aromatic polythiazole prepolymer having a large polymerization degree can be obtained without causing a ring closure reaction. The resulting aromatic polythiazole prepolymer has an intrinsic viscosity $\eta_{inh}$ of about 1.0–2.0 (measured at a concentration of 0.5 g/dl in N-methyl-2-pyrrolidone, 30° C.).

In the polymerization reaction in the step (b), the reaction between the monomer obtained in the step (a) and the dicarboxylic acid derivative proceeds as follows. Here, the monomer obtained in the step (a) is exemplified by 2,5-diamino-1,4-benzenedithiol dihydrochloride substituted with alkyl groups, and the dicarboxylic acid derivative is exemplified by terephthalic acid dichloride.

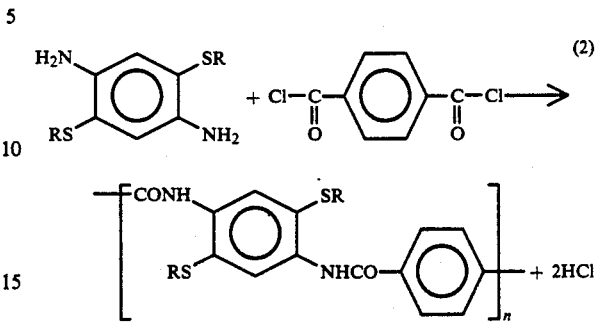

(2)

wherein n represents a degree of polymerization.

Incidentally, when the polymerization reaction is conducted by using two dicarboxylic acid derivatives, a prepolymer in the form of a copolymer as exemplified below can be obtained.

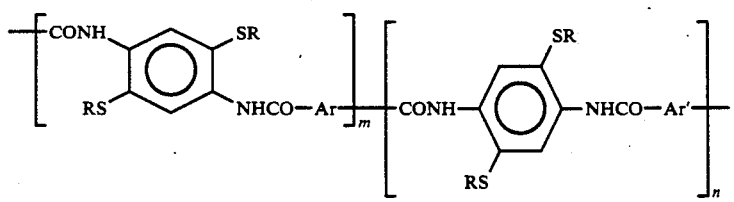

wherein Ar and Ar' respectively represent aromatic groups of the dicarboxylic acids, and m and n represent the numbers of repeating units (polymerization degree). Incidentally, depending upon the types of dicarboxylic acid derivatives, various copolymers are obtained without being limited to the above example.

The resulting aromatic polythiazole prepolymer is washed and dried by a known method.

The aromatic polythiazole prepolymer obtained by the method as described above and the matrix polymer are then dissolved in an organic solvent which is compatible with both components.

The organic solvents which may be used include N-methyl-2-pyrrolidone, dimethylsulfoxide, N,N-dimethyl-acetamide, etc.

With respect to the proportion of the aromatic polythiazole prepolymer to the matrix polymer, the aromatic polythiazole component may be included in an extremely small amount to achieve reinforcement, but the weight ratio of the aromatic polythiazole to the matrix polymer in the final product is preferably in the range of 1:1000–2:1. When the amount of the aromatic polythiazole serving as a reinforcing polymer is too large, it is so dense in the resulting molecular composite material that the aromatic polythiazole molecules undesirably tend to gather together to form clusters, making the dispersion of the aromatic polythiazole poor at a molecular level. Accordingly, the resulting molecular composite material has a poor mechanical strength. The preferred proportion of the aromatic polythiazole prepolymer to the matrix polymer is 1:100–1:10.

The aromatic polythiazole prepolymer and the matrix polymer may be dissolved in an organic solvent by any method as long as a homogeneous solution is produced. For instance, each of the aromatic polythiazole prepolymer solution and the matrix polymer solution may be prepared separately, and then mixed to provide a homogeneous solution, or the matrix polymer may be added to a solution in which the prepolymer is dissolved. Also, both components may be added at once to the same organic solvent. The concentration of the final solution is determined such that the total amount of the aromatic polythiazole prepolymer and the matrix polymer is 1-20 weight %.

With respect to the mixing time, it may depend upon the types of the matrix polymers and the solvents used, but it is preferably 6 hours to 30 days. With respect to the mixing temperature, it is preferably between $-15°$ C. and $150°$ C.

The aromatic polythiazole prepolymer solution and the matrix polymer solution may be prepared and mixed with each other preferably in an atmosphere of an inert gas such as a nitrogen gas, an argon gas, etc. or in vacuum.

After the preparation of a homogeneous solution, the organic solvent is evaporated. This evaporation step is preferably carried out after a film or a yarn is formed by a casting method.

Since a solution of the prepolymer substituted with alkyl groups shows a large liquid crystal property, it is easy to form yarns from a solution of the prepolymer and the matrix polymer in an organic solvent. Incidentally, to increase the liquid crystal property of the prepolymer, it is preferable that the alkyl groups bonded to the thiol groups are long. Actually, by taking into consideration the weight loss, etc. of the prepolymer by heating, the alkyl groups having proper length are preferably used.

The composite of the aromatic polythiazole prepolymer and the matrix polymer may be dried by a known method.

Next, the above composite of the aromatic polythiazole prepolymer and the matrix polymer is heated, so that a thiazole ring closure reaction takes place in the prepolymer to obtain a molecular composite material.

By this heat treatment, the alkyl group (R) is removed from the prepolymer, thereby forming a thiazole ring at that site. As a result, an aromatic polythiazole can be produced. When the aromatic polythiazole prepolymer obtained by the reaction (2) is used as a prepolymer, the poly-p-phenylenebenzobisthiazole having the following structure can be obtained.

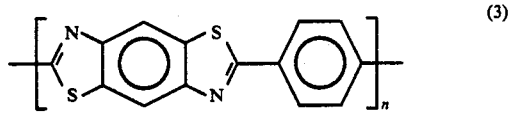

(3)

The ring closure reaction of the prepolymer is conducted by heating at $250°-450°$ C., within which range an actual heating temperature may vary depending on the types of the matrix polymer used. When the heating temperature is lower than $250°$ C., the thiazole ring cannot be formed. On the other hand, when heated at a temperature exceeding $450°$ C., the polythiazole is likely to be thermally decomposed. In view of this fact, the upper limit of the heating temperature is preferably $400°$ C.

The heating of the mixture of the prepolymer and the matrix polymer can be conducted at a constant temperature, and it may also be conducted according to a heating program in which a heating temperature is changed stepwise. One example of such a heating program comprises keeping at $120°$ C. for 30 minutes, heating from $120°$ C. to $350°$ C. over 30 minutes, and then keeping at $350°$ C. for 30 minutes.

By the above method, the aromatic polythiazole prepolymer homogeneously dispersed in the matrix polymer at a molecular level is converted to an aromatic polythiazole. Accordingly, excellent dispersion of the aromatic polythiazole in the matrix polymer to a molecular level can be achieved. This eliminates the problem of poor mechanical strength due to insufficient bonding strength in the interfaces between the aromatic polythiazole molecules and the matrix polymer molecules. Thus, the molecular composite material having excellent mechanical properties can be obtained.

According to the present invention, by using an aromatic diaminodithiol compound salt having thiol groups whose hydrogen atoms are substituted with alkyl groups in advance and by polymerizing it with a dicarboxylic acid derivative, the aromatic polythiazole prepolymer can be obtained. The prepolymer can be well dissolved in various organic solvents, and homogeneous dispersion of the prepolymer in the matrix polymer can be achieved. Since the thiol groups are protected by the alkyl groups, they do not constitute polymerization sites at which a thiazole ring closure reaction takes place, making it unlikely to cause the formation of insoluble components.

Also, since the aromatic diaminodithiol compound used has thiol groups whose hydrogen atoms are substituted with the alkyl groups, its polymerization reaction with the dicarboxylic acid derivative can be conducted at a lower temperature than in the conventional methods. In addition, by using alkyl groups having such substituent groups as a carboxyl group, an ester group, a cyano group and a benzyl group, etc., the ring closure reaction of the prepolymer can be achieved at an extremely low temperature. Since the prepolymer having alkyl groups substituted with these groups are extremely soluble in organic solvents such as N-methyl-2-pyrrolidone, etc., the polythiazole can be produced without using strong acids.

The present invention will be described in further detail by way of the following Examples.

EXAMPLE 1

(1) Synthesis of Monomer for Prepolymer 21.6 g of sodium hydroxide was dissolved in 300 ml of distilled water, and 30.0 g of 2,5-diamino-1,4-benzenethiol dihydrochloride was added and dissolved in the resulting sodium hydroxide solution while stirring and cooling it to $5°$ C. by ice water.

Dropped into the resulting solution while stirring was 22.4 ml of 3-bromopropiononitrile. In the course of dropping this 3-bromopropiononitrile, 3.0 g of cetyl trimethyl ammonium bromide was added. By dropping cetyl trimethyl ammonium bromide, precipitation took place immediately. While continuing the stirring of the solution, the solution was gradually heated to room temperature.

4 hours after keeping the solution at room temperature, the resulting reaction product was subjected to suction filtration by a glass filter, and a precipitate was sufficiently washed with distilled water. After washing, it was dried at $60°$ C. in vacuum. As a result, a yellowish solid material was obtained at a yield of 38.3 g.

The resulting solid was subjected to a recrystallization treatment by methylene chloride to obtain a greenish crystal which was dried in vacuum.

The resulting crystal material had a melting point of 130° C. Also, as a result of elemental analysis, the following data were obtained.

| Elemental Analysis: $C_{12}H_{14}N_4S_2$ | | | | |
|---|---|---|---|---|
| Element | C | H | N | S |
| Calculation | 51.77 | 5.07 | 20.12 | 23.04 |
| Measurement | 51.70 | 5.01 | 20.02 | 23.14 |

Further, as a result of $^1$H-NMR measurement, triplet peaks were observed at 2.97 ppm and 2.67 ppm, respectively, and singlet peaks were observed at 4.63 ppm and 6.79 ppm, respectively.

It was confirmed by the above analyses that the resulting crystal material had the following structure:

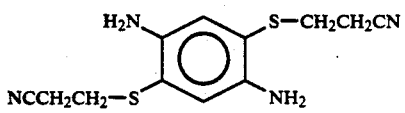

(2) Synthesis of Poly-p-Phenylenebenzobisthiazole Prepolymer Partially Substituted with Chloride 2.784 g of the compound (monomer) obtained in the above step (1) was dissolved in 20 ml of N-methyl-2-pyrrolidone (NMP).

The resulting solution was cooled in a salt ice water bath, and 2.375 g of 2-chloroterephthalic acid chloride was added. The solution was gradually heated to 0° C. while stirring and kept at 0° C.

When the solution became a viscous, clear, homogeneous, lime-green state, the solution was gradually heated to room temperature.

3 hours after introducing 2-chloroterephthalic acid chloride, the solution was slowly poured to methanol while stirring. After stirring for 30 minutes, filtration was conducted, and the solvent was removed.

The resulting polymer was dried at 60° C. for 24 hours in vacuum. Its yield was 4.43 g, amounting to 99.5%. This polymer had an intrinsic viscosity $\eta_{inh}$ of 2.10. Incidentally, the measurement of an intrinsic viscosity was conducted at a polymer concentration of 0.5 g/dl in NMP at 30° C. by an Ubbelode's viscometer.

Next, the elemental analysis of this polymer was conducted. The results are shown below.

| Elemental Analysis: $C_{20}H_{16}N_4S_2$ | | | | |
|---|---|---|---|---|
| Element | C | H | N | S |
| Calculation | 58.80 | 3.95 | 13.72 | 15.70 |
| Measurement | 58.63 | 3.87 | 13.51 | 15.55 |

From the above results, this polymer was identified as a prepolymer of poly-p-phenylenebenzobisthiazole, hydrogen atoms of whose thiol groups were substituted by 3-bromo-propinonitryl groups.

(3) Synthesis of Thermosetting Polyimide (Matrix Polymer)

4.3256 g (40 mmol) of p-phenylene diamine was dissolved in 80 ml of NMP at room temperature.

Next, 11.7689 g of 3,3'-4,4'-biphenyl tetracarboxylic diacid anhydride was added to the above solution, so that a polymerization reaction is carried out at 25° C. for 3 hours to obtain a polyamic acid.

(4) Production of Molecular Composite Material

The polyamic acid solution obtained in the step (3) was further diluted with NMP to prepare a solution of the polyamic acid at a concentration of 10 weight %.

Next, the polybenzothiazole prepolymer obtained in the step (2) was dissolved in NMP to prepare a prepolymer solution in NMP at 10 weight %.

Further, the above two solutions were mixed to produce two kinds of solutions having polybenzothiazole concentrations of 9 weight % and 17 weight %, respectively, based on the total polymer (polybenzothiazole + matrix polymer). These solutions were occasionally stirred at -15° C. and in an argon gas atmosphere for one week, so as not to cause hydrolysis of the polyamic acid. As a result, a homogeneous solution was obtained.

Each of the two kinds of solutions was subjected to slip casting on a glass plate using a doctor blade having a thickness of 0.5 mm to produce a film.

Each of the films was subjected to a heat treatment in vacuum under the heat treatment program shown in FIG. 1 to produce a film-like molecular composite material.

(5) Property Test

Figure 2:
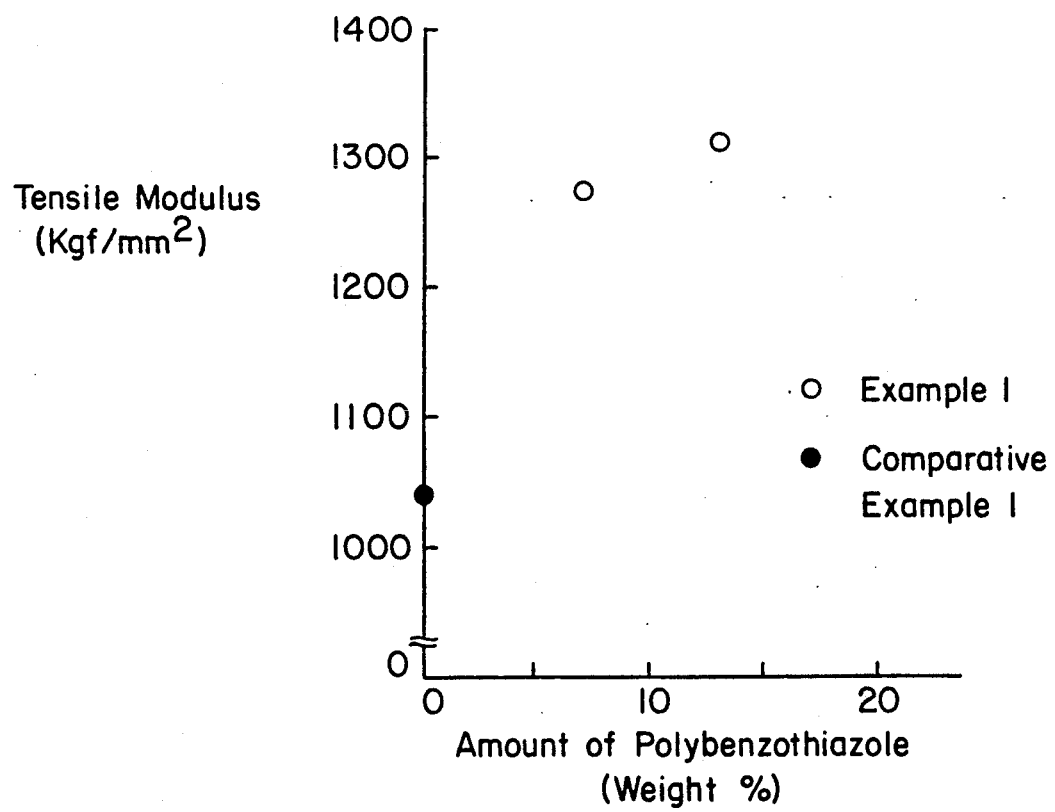
FIG. 2 is a graph showing the relation between tensile modulus and the amount of polybenzothiazole with respect to a molecular composite material sample of Example 1 and a sample of Comparative Example 1.

With respect to the two types of films obtained as described above, a tensile modulus was measured. This measurement was conducted according to JIS K7127. The results are shown in FIG. 2.

COMPARATIVE EXAMPLE 1

Using only the matrix polymer (consisting of thermosetting polyimide) of Example 1, it was produced into a film in the same manner as in Example 1. Also, the tensile modulus was measured in the same manner as in Example 1. The results are shown in FIG. 2.

EXAMPLE 2

The polybenzothiazole prepolymer obtained in the step (2) of Example 1 and a polyamide-imide power (AI-10, manufactured by Amoco) as the matrix polymer were used to produce a molecular composite material. In this case, five types of molecular composite materials having polybenzothiazole contents of 7–40 weight % based on the total polymer were produced as follows:

First, in the preparation of the homogeneous solution of the prepolymer and the polyamide-imide, NMP was used as an organic solvent, and the components were mixed in an argon atmosphere at room temperature. The mixing was carried out for one week while occasionally stirring.

Next, the resulting solution was formed into a film by the same slip casting method as in Example 1. After drying the film it was heated at 350° C. for 30 minutes in vacuum.

Figure 3:
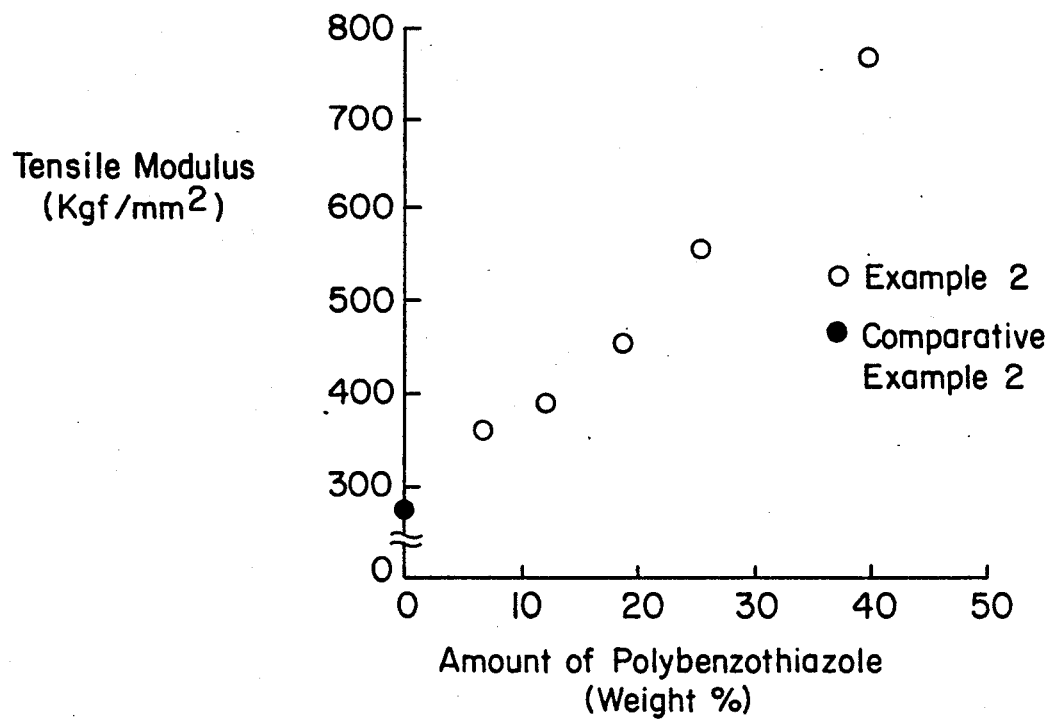
FIG. 3 is a graph showing the relation between tensile modulus and the amount of polybenzothiazole with respect to a molecular composite material sample of Example 2 and a sample of Comparative Example 2.

With respect to each of the films thus obtained, the tensile modulus was measured in the same manner as in Example 1. The results are shown in FIG. 3.

Figure 4:
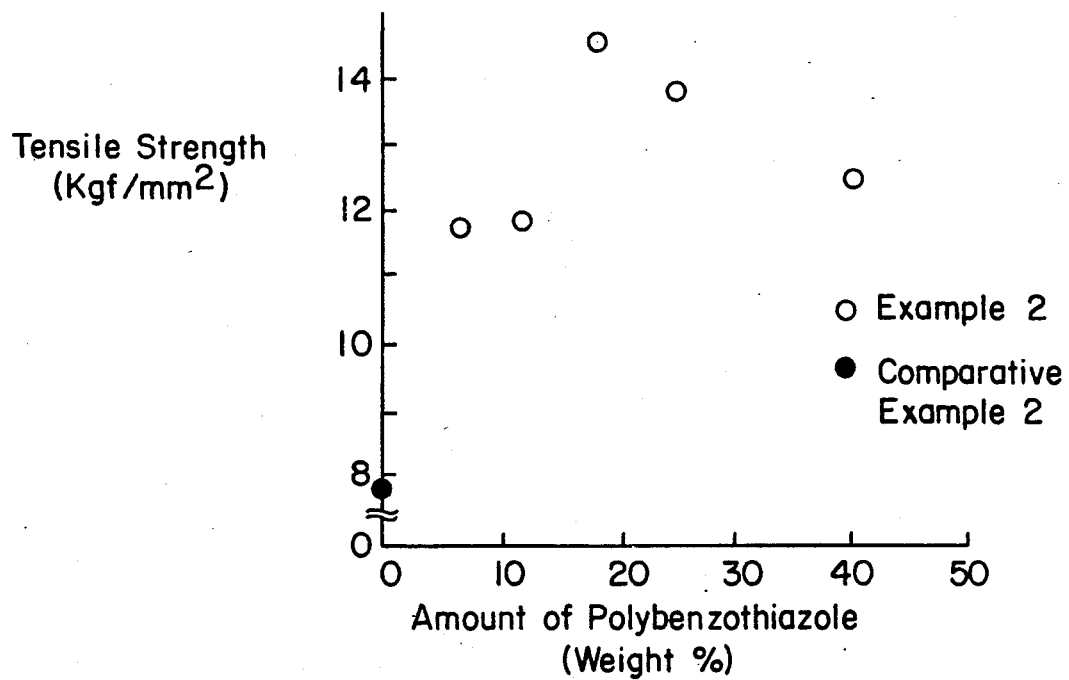
FIG. 4 is a graph showing the relation between tensile strength and the amount of polybenzothiazole with respect to a molecular composite material sample of Example 2 and a sample of Comparative Example 2.

Further, in each of these films, the tensile strength was measured. This measurement was conducted according to JIS K7127. The results are shown in FIG. 4.

COMPARATIVE EXAMPLE 2

Using only the matrix polymer (consisting of polyamide-imide) of Example 2, it was formed into a film in the same manner as in Example 2. Also, the tensile modulus was measured in the same manner as in Example 2. The results are also shown in FIG. 3. Further, as in Example 2, the tensile strength was measured. The results also are shown in FIG. 4.

EXAMPLE 3

The polybenzothiazole prepolymer obtained in the step (2) of Example 1 and a thermoplastic polyamide (XU-218, manufactured by Chiba Geigy) as the matrix polymer were used to produced a molecular composite material. In this case, two types of molecular composite materials having polybenzothiazole contents 5–30 weight % based on the total polymer were produce as follows:

First, the homogeneous solution of the prepolymer and the thermoplastic polyamide was obtained by preparing a 10-weight %-polybenzothiazole prepolymer solution in NMP and a 10-weight %-thermoplastic polyimide solution in NMP, and then mixing proper amounts of the two solutions at room temperature in an inert gas atmosphere. The mixing was carried out for one week while occasionally stirring.

Next, the resulting solution was formed into a film by the same slip casting method as in Example 1. After drying the film, it was heated at 350° C. for 30 minutes in vacuum.

Figure 5:
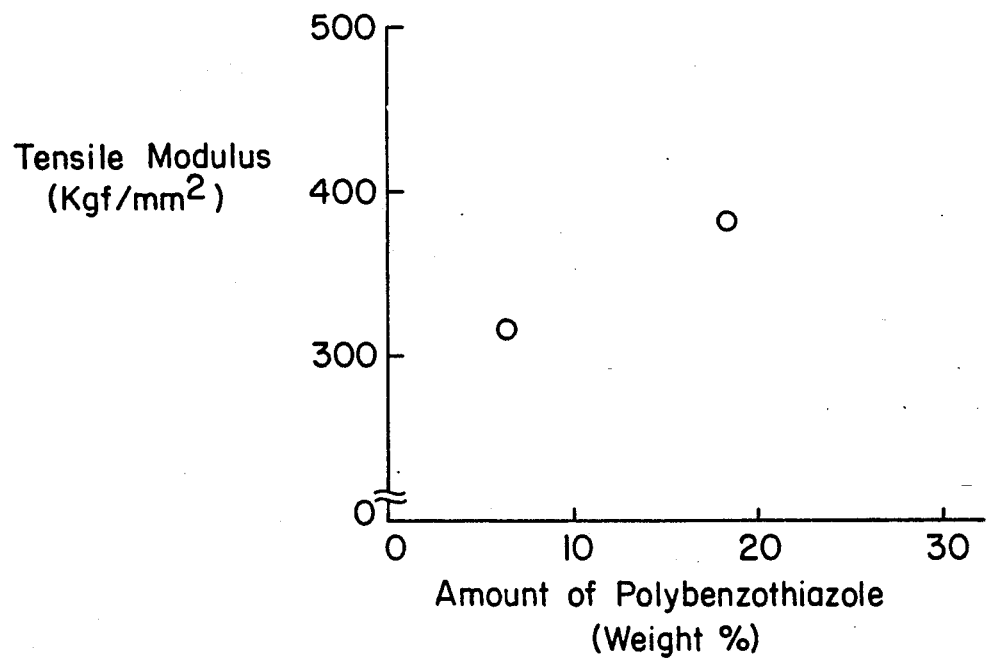
FIG. 5 is a graph showing the relation between tensile modulus and the amount of polybenzothiazole with respect to a molecular composite material sample of Example 3.

With respect to each of the films thus obtained, the tensile modulus was measured in the same manner as in Example 1. The results are shown in FIG. 5.

EXAMPLE 4

The polybenzothiazole prepolymer obtained in the step (2) of Example 1 and polyether sulfone (VICTREX PES4100G, manufactured by ICI) as the matrix polymer were used to produce a molecular composite material. In this case, two types of molecular composite materials having polybenzothiazole contents of 6 weight % and 12 weight %, respectively, based on the total polymers were produced as follows:

First, the homogeneous solution of the prepolymer and the polyether sulfone was obtained by preparing a 10-weight %-polybenzothiazole prepolymer solution in NMP and a 10-weight %-polyether sulfone solution in NMP, and then mixing proper amounts of the two solutions at room temperature in an inert gas atmosphere. The mixing was carried out for one week while occasionally stirring.

Next, the resulting solution was formed into a film by the same slip casting method as in Example 1. After drying the film, it was heated at 350° for 30 minutes in vacuum.

Figure 6:
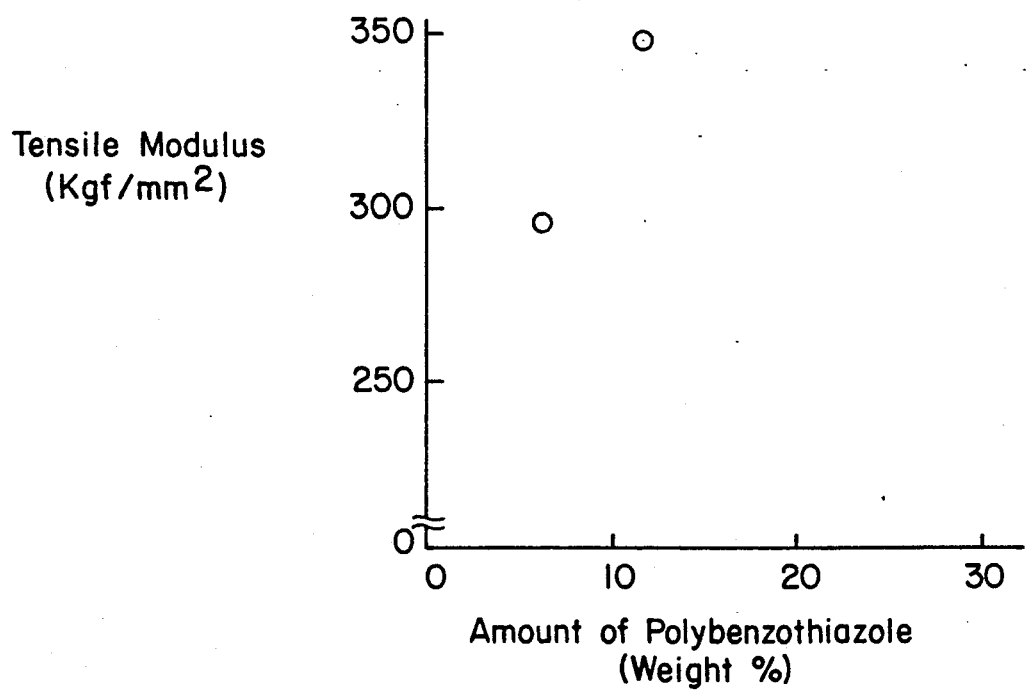
FIG. 6 is a graph showing the relation between tensile modulus and the amount of polybenzothiazole with respect to a molecular composite material sample of Example 4.

With respect to each of the films thus obtained, the tensile modulus was measured in the same manner as in Example 1. The results are shown in FIG. 6.

Figure 7:
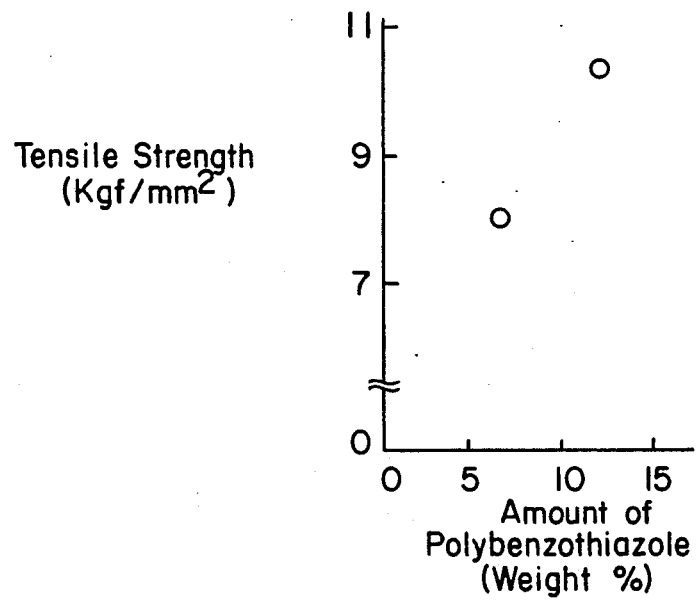
FIG. 7 is a graph showing the relation between tensile strength and the amount of polybenzothiazole with respect to a molecular composite material sample of Example 4.

Further, the tensile strength was measured in the same manner as in Example 2. The results are shown in FIG. 7.

EXAMPLE 5

In the same manner as in the step (2) of Example 1, two types of polybenzothiazole prepolymers having intrinsic viscosities $\eta_{inh}$ (measured at a polymer concentration of 0.5 g/dl in NMP using an Ubbedobe's viscometer at 30° C.) of 1.0 and 2.1, respectively, were produced.

Each of the above polybenzothiazole prepolymers was mixed with and aramide resin (TX-1, manufactured by Toray Industries, Inc.) as a matrix polymer to produce a plurality of molecular composite materials each having a polybenzothiazole content of 50 weight % or less based on the total polymer.

The homogeneous solution of the prepolymer and the aramide resin was obtained by preparing a 5-weight %-polyzenzothiazole prepolymer solution in NMP and a 5-weight %-aramide resin solution in NMP, and then mixing proper amounts of the two solutions at 40° C. in an inert gas atmosphere. This mixing was carried out for one week while occasionally stirring.

Next, the resulting solution was formed into a film by the same slip casting method as in Example 1. After drying the film, it was heated at 350° C. for 30 minutes in vacuum.

Figure 8:
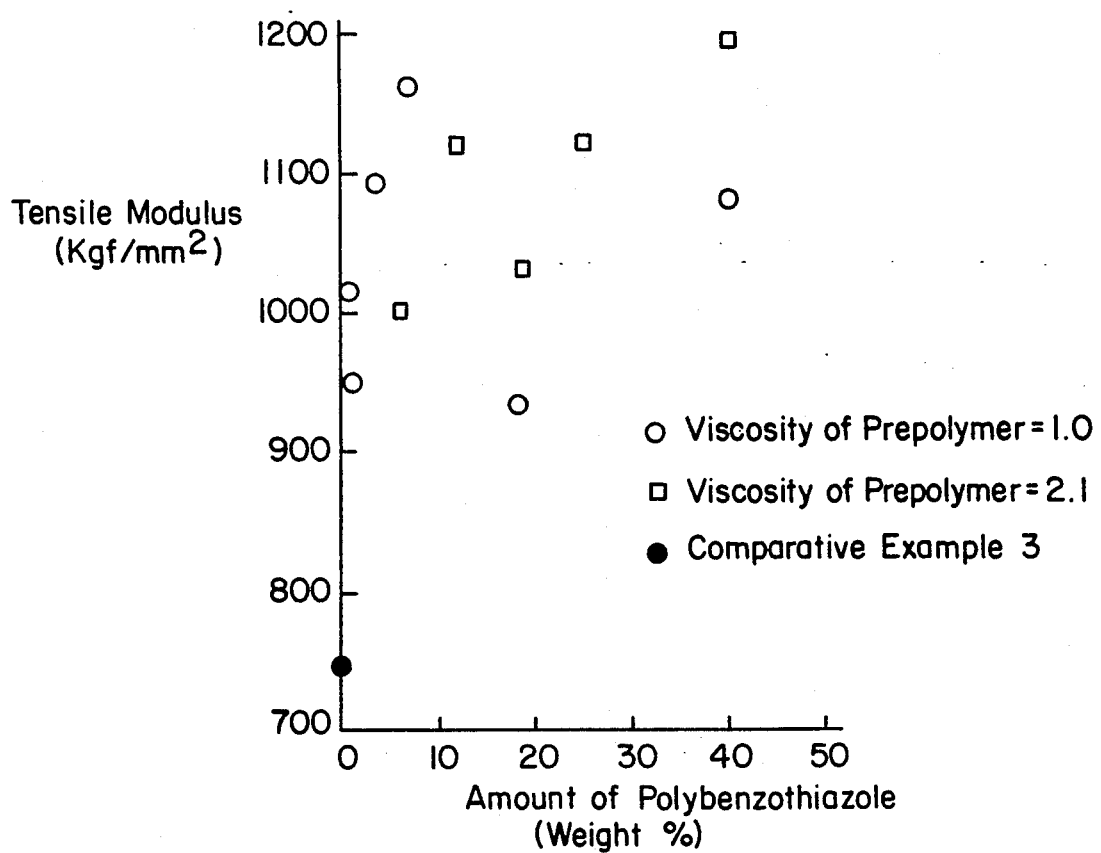
FIG. 8 is a graph showing the relation between tensile modulus and the amount of polybenzothiazole with respect to a molecular composite material sample of Example 5 and a sample of Comparative Example 3.

With respect to each of the films thus obtained, the tensile modulus was measured in the same manner as in Example 1. The results are shown in FIG. 8.

COMPARATIVE EXAMPLE 3

By only using the matrix polymer (aramide resin) of Example 5, a film was formed in the same manner as in Example 5, and its tensile modulus was measured in the same manner as in Example 5. The results are shown in FIG. 8.

As described above in detail, in the method of the present invention, an aromatic diaminodithiol compound, hydrogen atoms of whose thiol groups are in advance substituted with alkyl groups, is used, and this alkyl group-substituted aromatic diaminodithiol compound is polymerized with a dicarboxylic acid derivative. Since the thiol groups are protected by alkyl groups in this polymerization step, the dicarboxylic acid derivative is permitted to react selectively with amino groups. Thus, without producing insoluble by-products, a prepolymer having a structure in which the amino groups of the aromatic diaminodithiol compound are bonded with the dicarboxylic acid derivative can be formed.

In addition, by substituting the hydrogen atoms of the thiol group of the prepolymer with an alkyl group, the prepolymer has an improved solubility in an organic solvent, thereby causing interactions such as hydrogen bonding, etc. with the matrix polymer. Accordingly, the prepolymer can be homogeneously dispersed in the matrix polymer, thereby increasing the mechanical strength of the resulting molecular composite material.

The molecular composite materials obtained by the method of the present invention have excellent properties such as mechanical strength, heat resistance, solvent resistance, etc., so that they can be used widely for automobile parts, aircraft parts, space equipments, etc.

What is claimed is:

1. A method of producing a molecular composite material comprising a rigid aromatic polythiazole and a matrix polymer, which comprises the steps of:
   (a) polymerizing an aromatic diaminodithiol compound, wherein hydrogen atoms of thiol groups of said aromatic diaminodithiol compound are substituted with substituted or unsubstituted alkyl groups, with a dicarboxylic acid derivative to form an alkyl groups-substituted aromatic polythiazole prepolymer in an organic solvent;

(b) preparing a homogeneous solution of said alkyl group-substituted aromatic polythiazole prepolymer and said matrix polymer in an organic solvent; and (c) after removing said organic solvent, heating a mixture of said alkyl group-substituted aromatic polythiazole prepolymer and said matrix polymer to cause a thiazole ring closure reaction.

2. A method of producing a molecular composite material comprising a rigid aromatic polythiazole and a matrix polymer, which comprises the steps of:

(a) reacting an aromatic diaminodithiol compound salt with an alkyl halide having a substituted or unsubstituted alkyl group in an alkaline aqueous solvent, so that hydrogen atoms in thiol groups of the aromatic diaminodithiol compound are substituted with said alkyl group;

(b) polymerizing the resulting alkyl group-substituted aromatic diaminodithiol compound with a dicarboxylic acid derivative to form an alkyl group-substituted aromatic polythiazole prepolymer;

(c) preparing a homogeneous solution of said alkyl group-substituted aromatic polythiazole prepolymer and said matrix polymer in an organic solvent; and (d) after removing said organic solvent, heating a mixture of said aromatic polythiazole prepolymer and said matrix polymer to cause a thiazole ring closure reaction and form said molecular composite material.

3. The method according to claim 2, wherein said substituted alkyl group has a substituent group selected from the group consisting of a carboxyl group, an ester group, a cyano group, a benzyl group, a halogen group and a nitro group.

4. The method according to claim 2, wherein said dicarboxylic acid derivative is terephthalic acid dichloride.

5. The method according to claim 3, wherein said dicarboxylic acid derivative is terephthalic acid dichloride.

6. The method according to claim 2, wherein said matrix polymer is selected from the group consisting of aramide resins, polyether sulfones, polyether imides, polyimides and polyamide-imides.

7. The method according to claim 3, wherein said matrix polymer is selected from the group consisting of aramide resins, polyether sulfones, polyether imides, polyimides and polyamide-imides.

8. The method according to claim 4, wherein said matrix polymer is selected from the group consisting of aramide resin, polyether sulfones, polyether imides, polyimides and polyamide-imides.

9. The method according to claim 5, wherein said matrix polymer is selected from the group consisting of aramide resins, polyether sulfones, polyether imides, polyimides and polyamide-imides.

10. The method according to claim 1, wherein the reaction of said alkyl group-substituted aromatic diaminodithiol compound with said dicarboxylic acid derivative is conducted in an organic solvent selected from the group consisting of N-methyl-2-pyrrolidone and N,N-dimethylacetamide.

11. The method according to claim 2, wherein the reaction of said alkyl group-substituted aromatic diaminodithiol compound with said dicarboxylic acid derivative is conducted in an organic solvent selected from the group consisting of N-methyl-2-pyrrolidone and N,N-dimethylacetamide.

12. The method according to claim 1, wherein said aromatic diaminodithiol compound is substituted with an unsubstituted alkyl group selected from the group consisting of isopropyl, ethyl, n-propyl, n-butyl, sec-butyl, and tert-butyl.

13. The method according to claim 2, wherein said aromatic diaminodithiol compound is substituted with an unsubstituted alkyl group selected from the group consisting of isopropyl, ethyl, n-propyl, n-butyl, sec-butyl, and tert-butyl.

14. The method according to claim 12, wherein said matrix polymer is selected from the group consisting of aramide resins, polyether sulfones, polyether imides, polyimides and polyamide-imides.

15. The method according to claim 13, wherein said matrix polymer is selected from the group consisting of aramide resins, polyether sulfones, polyether imides, polyimides and polyamide-imides.

16. The method according to claim 1, wherein said aromatic diaminodithiol compound is substituted with a substituted $C_2$-$C_5$ alkyl group which is substituted with a member selected from the group consisting of a carboxyl group, an ester group, a cyano group, a benzyl group, a halogen group and a nitro group.

17. The method according to claim 2, wherein said aromatic diaminodithiol compound is substituted with a substituted $C_2$-$C_5$ alkyl group which is substituted with a member selected from the group consisting of a carboxyl group, an ester group, a cyano group, a benzyl group, a halogen group and a nitro group.

18. The method according to claim 1, wherein said aromatic diaminodithiol group is substituted with a member selected from the group consisting of

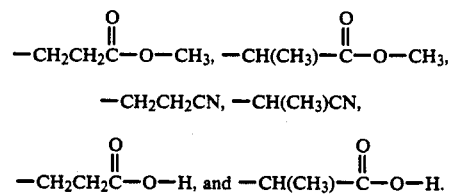

19. The method according to claim 2, wherein said aromatic diaminodithiol group is substituted with a member selected from the group consisting of

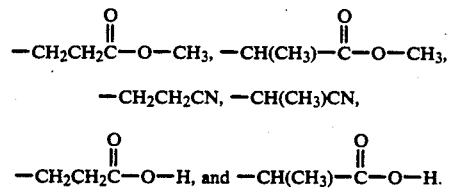

20. The method according to claim 1, wherein said dicarboxylic acid derivative includes unsubstituted carboxylic groups or substituted carboxylic groups selected from the group consisting of

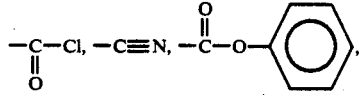

-continued $-\underset{\underset{O}{\|}}{C}-NH_2$, and $-\underset{\underset{O}{\|}}{C}-O-CH_3$, and wherein residual groups of said dicarboxylic acid derivatives are aromatic groups selected from the group consisting of

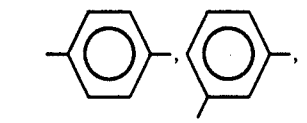

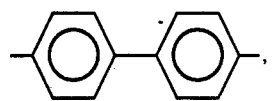

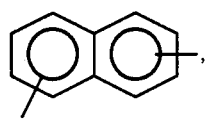

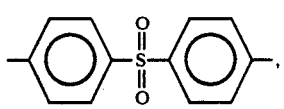

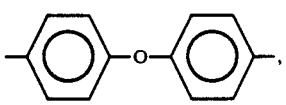

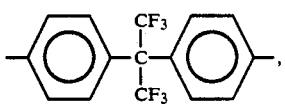

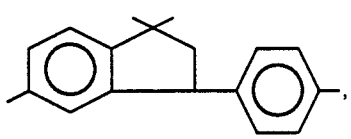

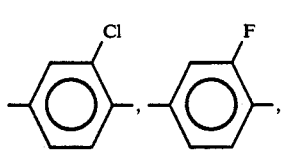

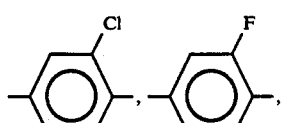

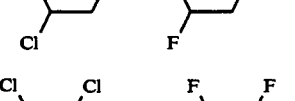

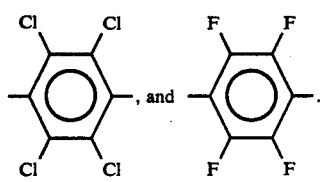

21. The method according to claim 2, wherein said dicarboxylic acid derivative includes unsubstituted carboxylic groups or substituted carboxylic groups selected from the group consisting of

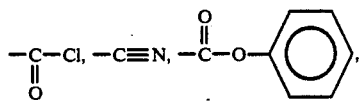

$-\underset{\underset{O}{\|}}{C}-NH_2$, and $-\underset{\underset{O}{\|}}{C}-O-CH_3$, and wherein residual groups of said dicarboxylic acid derivatives are aromatic groups selected from the group consisting of

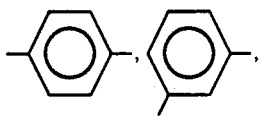

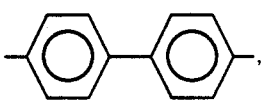

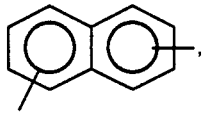

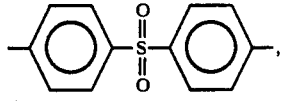

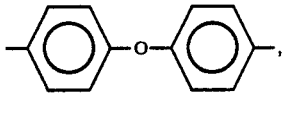

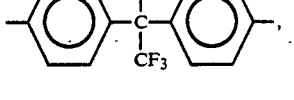

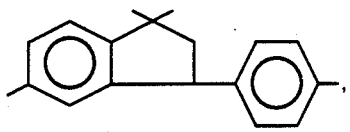

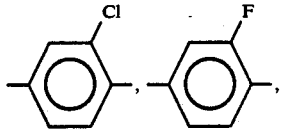

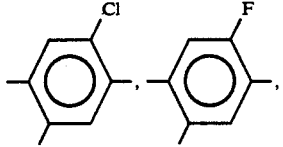

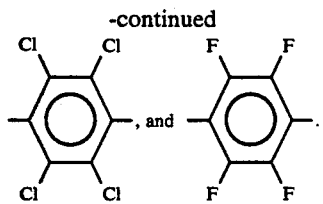

22. A method of producing a molecular composite material comprising a rigid aromatic polythiazole and a matrix polymer, which comprises the steps of:
(a) reacting an aromatic diaminodithiol compound salt with an alkyl halide having a substituted or unsubstituted alkyl group in an alkaline aqueous solvent, so that hydrogen atoms in thiol groups of the aromatic diaminodithiol compound are substituted with said alkyl group;
(b) polymerizing the resulting alkyl group-substituted aromatic diaminodithiol compound with a dicarboxylic acid derivative to form an alkyl group-substituted aromatic polythiazole prepolymer;
(c) preparing a homogeneous solution of said alkyl group-substituted aromatic polythiazole prepolymer and said matrix polymer in an organic solvent; and
(d) after removing said organic solvent, heating a mixture of said aromatic polythiazole prepolymer and said matrix polymer to cause a thiazole ring closure reaction and form said molecular composite material,
wherein said matrix polymer is selected from the group consisting of aramide resins, polyether sulfones, polyether imides, polyimides and polyamide-imides, and
wherein said dicarboxylic acid derivative includes unsubstituted carboxylic groups or substituted carboxylic groups selected from the group consisting of

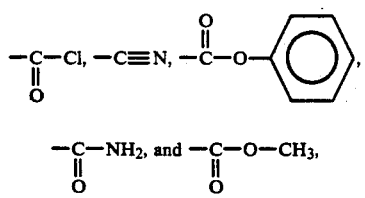

and wherein residual groups of said dicarboxylic acid derivatives are aromatic groups selected from the group consisting of

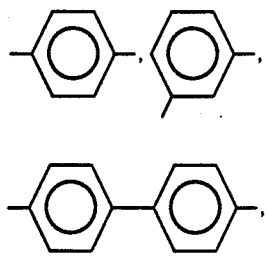

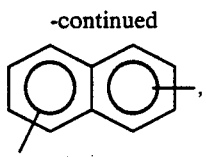

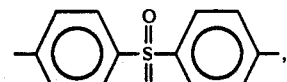

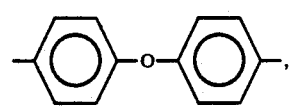

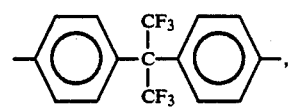

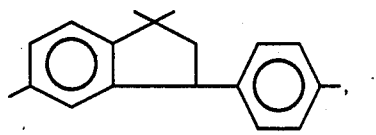

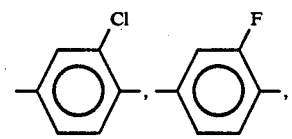

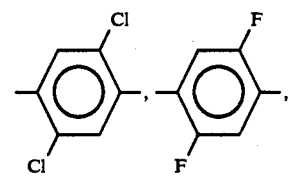

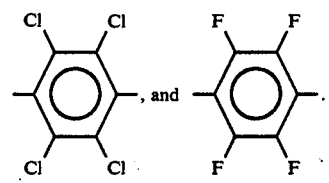

23. The method according to claim 22, wherein said aromatic diaminodithiol compound are substituted with an unsubstituted alkyl group selected from the group consisting of isopropyl, ethyl, n-propyl, n-butyl, sec-butyl, and tert-butyl.

24. The method according to claim 22, wherein said aromatic diaminodithiol compound is substituted with a substituted $C_2$–$C_5$ alkyl group which is substituted with a member selected from the group consisting of a carboxyl group, an ester group, a cyano group, a benzyl group, a halogen group and a nitro group.

25. The method according to claim 1, wherein step (a) is conducted at a temperature of from $-20°$ C. to $+100°$ C.

26. The method according to claim 1, wherein step (a) is conducted at a temperature of from $-20°$ C. to $+50°$ C.

27. The method according to claim 22, wherein step (a) is conducted at a temperature of from $-20°$ C. to $+100°$ C.

28. The method according to claim 22, wherein step (a) is conducted at a temperature of from $-20°$ C. to $+50°$ C.

* * * * *